March 18, 1958        R. R. GAMZON        2,827,601
TRIMMING CONDENSERS
Filed April 30, 1956
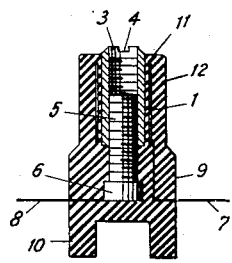
_FIG.1._
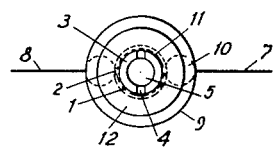
_FIG.2._
INVENTOR.
Robert Gamzon
BY Mock & Blum
attorneys United States Patent Office 2,827,601
Patented Mar. 18, 1958

2,827,601

TRIMMING CONDENSERS

Robert Ruben Gamzon, Herzlia, Israel, assignor to Amron (Israel) Ltd., Tel Aviv, Israel, an Israeli company Application April 30, 1956, Serial No. 581,567

Claims priority, application Israel June 15, 1955

1 Claim. (Cl. 317—249)

The invention consists in trimming condensers or trimmers comprising a fixed plate constituted by a cylindrical metal sleeve, and a variable plate constituted by a substantially cylindrical metal sleeve coaxially disposed within said fixed sleeve and axially displaceable relative to the latter; and a coherent body of thermoplastic synthetic material forming a dielectric between the two plates, a layer surrounding the fixed sleeve, and a mounting base.

It is preferred completely to embed the fixed plate in the body of thermoplastic material so that it is floating therein.

The variable plate is internally threaded and screwed on a threaded pin which is fixedly anchored in the base. Variations of capacity are produced by screwing said inner sleeve up or down the pin.

In known trimmers of similar design, the base, which consists usually of porcelain, is separate from the dielectric which usually is made from mica or plastic material wrapped round the inner sleeve. These known trimmers have some drawbacks. For example, moisture is apt to penetrate between the dielectric and fixed plate and to increase the dielectric losses in an uncontrolled manner. Moreover, the manufacture of these trimmers is expensive.

The invention avoids these drawbacks.

A highly suitable thermoplastic material for the purposes of the invention is, for example, polythene, but other materials having analogous properties may be used instead.

It has been found preferable to create a bond between the dielectric and the fixed plate. For this purpose, the sleeve forming the fixed plate may be perforated so that the layers of the dielectric material covering the inner and outer surfaces of the sleeve are integrally interconnected through the perforations of the sleeve.

Or else, this sleeve may be roughened on its inner and/or outer surfaces, e. g. by etching, mechanical scratching or the like, which makes the dielectric material adhere to the surfaces of the sleeve.

If polythene or a material of similar properties is used as the dielectric it is found that the permittivity of the trimmer drops with rising temperature. In the case of polythene, for example, there occurs over the range between 20 and 100° C. an almost linear decrease from 2.3 to 2.15. Moreover, polythene has a rather large coefficient of thermal expansion. These properties, whose adverse effects are cumulative, have so far prevented large-scale use of polythene and similar materials as dielectrics for high-frequency condensers, in spite of their very good insulating properties.

It is now found that the negative influence of a rise of temperature on the permittivity can be diminished, eliminated or even converted into a positive influence, if the dielectric is subjected with rising temperature to compression between the plates of the trimmer. This compression occurs if the trimmer is so designed that the space between the plates does not widen with rising temperature in the same measure as the dielectric tends to expand. It is even possible so to arrange the trimmer that the said space remains constant or even becomes narrower with rising temperature.

Where the two plates consist of the same metal, e. g. brass, the compression of the dielectric tends to become so strong that the permittivity rises, though slightly, with rising temperature. This rise is counteracted by the narrow slot provided in the fixed plate along a generatrix over its entire height. The permittivity can thus be kept constant or be made to drop with rising temperature, the more so the wider the slot.

The plates may, however, be made from different metals, and this, in combination with a slot of properly selected width in the fixed plate, makes it possible to coordinate the permittivity to the changes of temperature in any desired manner. Another controlling factor is the thickness of the dielectric in relation to the thickness and inner diameter of the sleeve forming the fixed plate.

For example, a trimming condenser was made as follows:

The variable plate was a sleeve of brass, height 11 mm., outer diameter 6 mm.; the fixed plate or outer sleeve was made from brass, inner diameter 6.3 mm., thickness 0.3 mm.; the dielectric was polythene, thickness 0.15 mm. between the two sleeves. The thickness of the outer layer of polythene should be larger than that of the dielectric layer between the sleeves; it may even be a multiple of the dielectric e. g. 1 mm. to 1.5 mm. in the example aforesaid. This condenser had a capacity of about 25–30 picofarads and its permittivity so increased was that of the condenser as a whole. The question whether the intrinsic permittivity of the polythene or the like material is affected by the temperature rise under the conditions of compression created by the design of the condenser, is not relevant for the purposes of the invention.

Analogous results, with an even greater increase of the permittivity, were obtained with a condenser of the same design and similar dimensions in which, however, the outer sleeve was made from mild steel while the inner sleeve consisted of brass.

In such a trimmer the permittivity can be kept constant in that, the outer sleeve forming the fixed plate has over its entire height a very narrow slot, say of the order of from 0.05 to 0.1 mm. If the slot is wider, the permittivity drops with rising temperature, the more so the wider the slot. With a slot of 0.5 mm. width the drop of permittivity, though noticeable, is still appreciably smaller than in a trimmer in which the dielectric can expand with rising temperature substantially without compression.

Thus, the designer may, by the judicious selection of the metal of the plates, the dimension of the plates, the thickness of the dielectric and, if desired, the provision of a slot in the fixed plate and the proper dimensioning of the width of such slot, determine the constancy or variation of the capacity of the trimmer at different temperatures.

The invention is illustrated, by way of example only, in the accompanying drawings in which:

Figs. 1 and 2 show in axial section and in plan view, respectively, a first embodiment of the invention The trimmer illustrated in Figs. 1 and 2 comprises a fixed plate 1 constituted by a plain cylindrical metal sleeve which has a narrow throughgoing slot 2 over its whole height along a generatrix. The variable plate is a cylindrical metal sleeve 3 coaxially disposed within the sleeve 1 and having substantially the same height as the latter. The sleeve 3 has in its upper edge notches 4 for the insertion of a screw-driver, and it is threaded in its interior and screwed on a threaded pin 5 provided with an enlarged foot part 6. The current leads 7, 8 of the trimmer are connected to the outer sleeve 1 and to the foot part 6 of the pin 5, respectively. The trimmer has its greatest capacity when the inner sleeve 3 is screwed down so that its upper edge is substantially flush with that of the outer sleeve 1, and the capacity can be diminished by screwing the inner sleeve 3 upwards to the desired extent.

A single coherent body of an appropriate thermoplastic material, e. g. polythene, constitutes the base 9 of the trimmer in which the foot part 6 of the pin is anchored, and which is made integral with mounting studs 10, the dielectric layer 11 between the sleeves 1 and 3, and an outer layer 12 surrounding the outer sleeve 3. The outer sleeve thus floats in this body of thermoplastic material and is protected on all sides from contact with air or moisture. This protecting coat is pierced solely by the wire 7 which is so thin that moisture can not creep along this wire from the atmosphere to the sleeve 1. The trimmer has, therefore, virtually no leakages.

In the manufacture of this trimmer, the inner sleeve is first coated with the dielectric, being a layer of the thermoplastic material selected, e. g. polythene. Thereafter, the inner sleeve is screwed on the pin, the outer sleeve is slid on the dielectric, the current leads are connected to the two sleeves, and this unit is introduced into an appropriate mould where the base and the outer layer 10 are produced by casting or injection from the same thermoplastic material. In the process, the dielectric layer 9 enclosed between the sleeves becomes integrally fused together with the base and outer layer 10. Alternatively, the dielectric layer 9 may also be produced in the mould in the same operation by which the outer layer and base are made.

The trimmers according to the invention are easy and cheap to manufacture, in contrast to known trimmers having similar design but using a porcelain base and a dielectric not integral with the base. The trimmers according to the invention lend themselves, therefore, to low-cost mass production.

Moreover, the present invention makes possible for the first time the safe use of polythene or other thermoplastic materials of similar properties for the constitution of the dielectric. The use of these thermoplastic materials gives considerable advantages of which the following may be mentioned: low dielectric losses; very good insulation; lubricating effect of the polythene on the variable plate which facilitates the adjustment of the latter without producing frictional stresses on the dielectric; the possibility to produce at will a positive, zero or negative drift (change of permittivity). The fact that the outer plate is completely embedded in the dielectric material provides the additional advantage that the low dielectric loss and good insulation persist even in a rather moist atmosphere.

I claim:

A trimmer comprising a fixed plate constituted by a substantially cylindrical metal sleeve having a throughgoing longitudinal slot; a variable plate constituted by an internally threaded metal sleeve screwed on a fixed threaded pin and axially displaceable within said fixed sleeve in co-axial relation thereto; and a coherent body of thermoplastic synthetic material which forms a dielectric with which the variable plate is in sliding engagement, a layer surrounding the fixed sleeve which is completely enclosed by said body so as to float therein, and a mounting base in which said pin is embedded.

References Cited in the file of this patent

UNITED STATES PATENTS

| | | |
|---|---|---|
| 2,166,205 | Anderson | July 18, 1939 |
| 2,299,271 | Godsey | Oct. 20, 1942 |
| 2,579,789 | Bussard | Dec. 25, 1951 |
| 2,688,177 | Wagner | Sept. 7, 1954 |

FOREIGN PATENTS

| | | |
|---|---|---|
| 584,251 | France | Nov. 17, 1924 |
| 524,434 | Great Britain | Aug. 6, 1940 |
| 628,922 | Great Britain | Sept. 7, 1949 |
| 175,643 | Austria | July 25, 1953 |